J. F. COURSON.
FRICTION DRAFT GEAR.
APPLICATION FILED SEPT. 21, 1910.
1,011,034.
Patented Dec. 5, 1911.
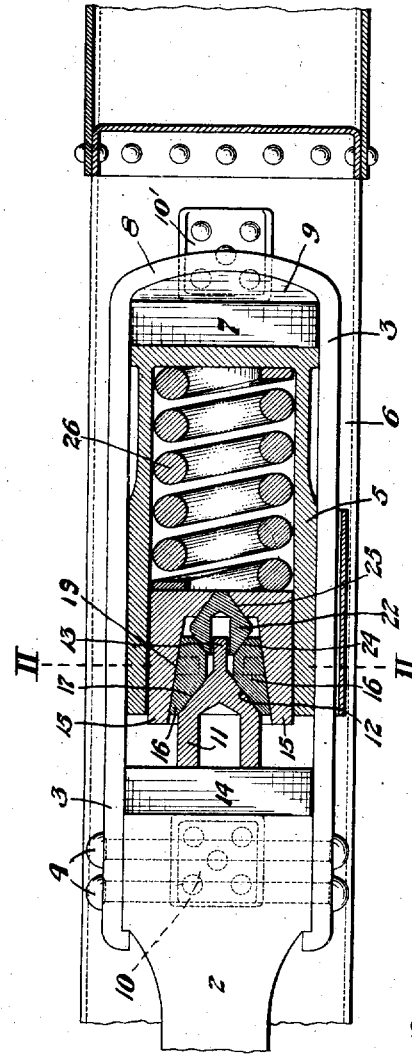
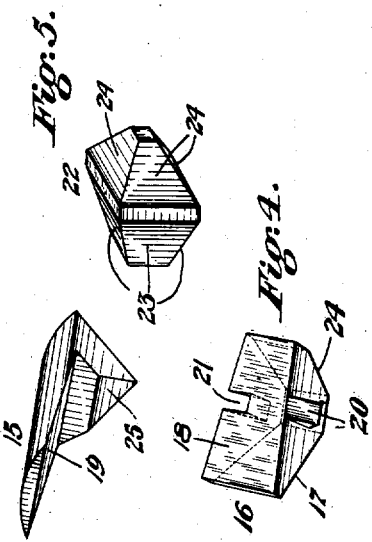
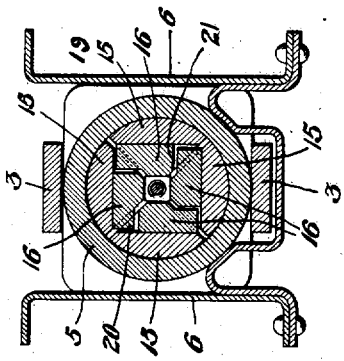
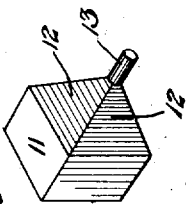
Witnesses:
Chas. S. Lepley
Henry Dens.
Inventor:
John F. Courson
by C. M. Clarke
his attorney

UNITED STATES PATENT OFFICE.

JOHN F. COURSON, OF PITCAIRN, PENNSYLVANIA.

FRICTION DRAFT-GEAR.

1,011,034. Specification of Letters Patent. Patented Dec. 5, 1911.

Application filed September 21, 1910. Serial No. 583,016.

*To all whom it may concern:*

Be it known that I, JOHN F. COURSON, a citizen of the United States, residing at Pitcairn, in the county of Allegheny and State of Pennsylvania, have invented certain new and useful Improvements in Friction Draft-Gear, of which the following is a specification.

My invention consists of an improvement in friction draft gears for railway cars, etc., and it has for its object to provide a draft gear simple in construction and of high efficiency, designed to utilize the wedging and releasing qualities of wedge locks between a central buffing member and surrounding friction member or members, having faces disposed at varying angles, together with a supplemental separating wedge engaging the friction members and differential angle wedge blocks respectively.

The particular object of the present invention is to provide, in a friction draft gear of this type, means for equalizing the surface pressure of the friction shoes against the interior faces of the surrounding cylinder; increasing the frictional efficiency of the apparatus as a whole; and insuring the separation of the several parts upon release of pressure.

These objects are accomplished by the construction more fully hereinafter set forth.

In the drawings:—Figure 1 is a central vertical sectional view of the complete draft gearing assembled, the parts being shown in extended position. Fig. 2 is a cross sectional view on the line II. II. of Fig. 1. Fig. 3 is a detail view in perspective of one of the friction shoes. Fig. 4 is a similar view of one of the differential angle wedge blocks. Fig. 5 is a similar view of the terminal separating wedge. Fig. 6 is a similar view of the central wedge block.

In the drawings, 2 represents the draw bar of a coupler fixedly connected with the yoke 3 by transverse bolts 4, in the manner customary in this art, said yoke embracing the casing or cylinder 5 at top and bottom as shown, the yoke and casing being located between the central sills 6, 6.

A bearing block or piece 7 is set against the rear end of cylinder 5 against the outer end of which block bears the rounded end 8 of yoke 3 with an interposed filling block 9, preferably secured to the end of the yoke. The front stops 10 are shown in dotted lines in Fig. 1 extending inwardly at each side from the center sills 6, which sustain the pulling effect of the draft gear and impart it to said sills, while similar rear stops 10' act to receive and impart buffing strains in the same manner.

The central wedge block 11 has angularly disposed wedge faces 12 of pyramidal arrangement, corresponding in number to the differential angle wedge blocks, said faces 12 tapering forwardly from its body portion at about 40° to the horizontal, more or less. Said wedge block 11 is preferably provided with a rearwardly extending central stem 13 projecting into a receiving clearance opening of the terminal separating wedge 22, although such stem is not absolutely necessary. Wedge block 11 extends forwardly and bears by its main body portion against front follower plate 14, which plate in turn engages the rear of draw bar 2 between the arms of the yoke 3.

The friction blocks or shoes 15 are of a number corresponding to the faces 12 of central wedge block 11. Said friction shoes 15 are rounded to fit the interior of cylinder 5, which is preferably slightly tapered toward its opposite end as shown, and the friction shoes extend inwardly at their rear ends in segmental form as shown. The differential angle wedge blocks 16 intervene between the central wedge block 11 and the friction shoes, said blocks 16 having their inner faces 17 inclined at the same angle as the somewhat blunt faces 12 of the central wedge block, while their outer faces 18 are inclined at a much more acute angle, corresponding to the angle of faces 19 of the friction shoes 15. The differential angle blocks 16, of the same number as the friction shoes 15 and faces 12, preferably four, are each provided at one side with a key 20 adapted to interfit within the receiving cavity 21 of the adjacent wedge block, so that when loosely assembled they will all be maintained longitudinally together, but each capable of a slight independent movement with regard to the other. The object of this construction is to maintain all of the differential angle wedge blocks in grouped arrangement, permitting them to have free lateral and longitudinal movement together.

The terminal separating wedge 22 is of double truncated pyramidal form, having front blunt wedge faces 23 of about the same angle as faces 12, and adapted to engage wedge faces 24 at the rear inner ends of differential angle wedge blocks 16. The rearward portion of terminal separating wedge 22 is similarly provided with blunt wedge faces 24, preferably very slightly more acute than faces 23, but of an ample angle to insure prompt release from between the rear segmental portions of the friction shoes 15. Said rear segmental portions are provided at their inner faces with wedging surfaces 25, corresponding to angle faces 24 of the terminal separating wedge 22, against which they bear, as clearly shown. A buffing spring 26 is of well known construction and function, interposed between the inner end of cylinder 5 and the rear ends of friction shoes 15, as clearly shown.

The construction of the device is similar to that shown in my prior applications Serial Nos. 476588 and 482318, with the exception of the terminal separating wedge 22. The object of said wedge is to supplement the function and effect of the differential angle wedge blocks 16, in effecting spreading of the friction shoes 15 equally throughout their entire length, and with resulting equalization of the frictional contact between their exterior surfaces and the interior of cylinder 5. It accomplishes this object by effecting the separation of the inner segmental terminals of the friction shoes, due to the inward travel of angle blocks 16 when forced inwardly by the impact of buffing. As blocks 16 travel backwardly, they are likewise slightly collapsed, due to the slight taper of faces 18 and 19, and their other more blunt faces 24 acting on faces 23, force the terminal separating wedge 22 inwardly between faces 25 of the friction shoes by engaging said faces with faces 24 of the separating wedge. The effect of this action is to spread the inner ends of the friction shoes and to bind them tightly against the cylinder, in conjunction with the main spreading effect of the angle blocks 16. In pulling, the effect will be the same, but usually to a less degree, the load acting through strap 3, cylinder 5 and spring 26 against the rear end of the friction shoes.

In operation, the entire assembled wedge construction will become slightly elongated due to the inward movement of blocks 16, necessarily forcing separating wedge 22 beyond the main central wedge 11. Upon release of pressure the working parts will be immediately separated due to the co-acting blunt faces of the main central wedge, differential angle wedge blocks 16, and of the terminal separating wedge 22. Said wedge will necessarily expand the inner portion of the friction shoes in conjunction with the wedges 16, whereby to insure a uniform frictional contact throughout the entire length of the friction shoes within the cylinder, thereby tending to increase its capacity and utilizing the full effective area, without undue wear at any point.

The operation of the apparatus will be readily understood from the foregoing description.

The advantages result primarily in the great frictional contact pressure between the friction shoes and cylinder within a comparatively short range of longitudinal movement equally through the shoes and the immediate and complete separation of the binding parts upon release of buffing or pulling pressure. The parts are easily assembled and maintained in assembled relation by reason of the interfitting engagement of the several differential angle blocks, while the expanding and releasing effect of the terminal separating wedge insures a symmetrical disposition of the frictional strains.

Having described my invention, what I claim is:—

1. In a friction draft gear, the combination with the casing and the relatively movable draw bar; of friction shoes engaging the casing having angle faces, a central buffing block having angle faces, interposed wedge blocks having corresponding angle faces, and a terminal separating wedge having angle faces engaging said interposed wedge blocks and the friction shoes respectively.

2. In a friction draft gear, the combination with the casing and the relatively movable draw bar; of friction shoes engaging the casing each having an acute and a blunt angle face respectively, a central buffing block having blunt angle faces, wedge blocks interposed between the central buffing block and the friction shoes engaging the acute angle faces of the shoes and the faces of the buffing block and having inner blunt angle faces, and a terminal separating wedge having blunt angle faces engaging the blunt faces of the friction shoes and of the interposed wedge blocks respectively.

3. In a friction draft gear, the combination with the casing and the relatively movable draw bar; of friction shoes engaging the casing, a central buffing block wedge, and a series of segmental wedge blocks interposed between the friction shoes and the central buffing block provided with meeting faces co-extensive with their length and having co-acting lateral extensions and depressions, substantially as set forth.

4. In a friction draft gear, the combination with the casing and the relatively movable draw bar; of friction shoes engaging the casing, a central buffing block wedge, a series of wedge blocks interposed between the friction shoes and the central buffing block having co-acting lateral extensions and depressions, and a terminal separating wedge having angle faces engaging said interposed wedge blocks and the friction shoes respectively.

5. In a friction draft gear, the combination with the casing, friction shoes, and buffing block; of a plurality of segmental differential angle wedge blocks between the friction blocks and wedge block closely assembled together and adjacent to each other throughout their length, each of said blocks having between its ends interengaging rectangular shoulders and recesses co-acting with corresponding elements on the adjacent block to prevent relative longitudinal movement of either block and a terminal separating wedge having oppositely disposed series of wedge faces engaging the inner terminal faces of the friction shoes and wedge blocks respectively.

6. In a friction draft gear, the combination with a casing and a relatively movable draw bar; of friction shoes engaging the casing having inner acute and blunt wedge faces respectively, a central buffing wedge block, wedge blocks interposed between it and the acute wedge faces of the friction shoes, and a terminal separating wedge engaging said wedge blocks and having faces engaging the blunt faces of the friction shoes for expanding them within the casing when the casing or draw bar approaches the one toward the other.

7. In a friction draft gear, the combination with the casing and the relatively movable draw bar; of friction shoes engaging the casing having terminal wedge faces, a separating wedge engaging said faces, and means within the friction shoes for expanding them within the casing and for exerting inward pressure against said terminal wedge when the casing or draw bar approaches the one toward the other.

In testimony whereof I hereunto affix my signature in the presence of two witnesses.

JOHN F. COURSON.

Witnesses:
  C. M. CLARKE,
  CHAS. S. LEPLEY.

---

Correction in Letters Patent No. 1,011,034.

It is hereby certified that in Letters Patent No. 1,011,034, granted December 5, 1911, upon the application of John F. Courson, of Pitcairn, Pennsylvania, for an improvement in "Friction Draft-Gear," an error appears in the printed specification requiring correction as follows: Page 1, line 14, for the word "locks" read *blocks;* and that the said Letters Patent should be read with this correction therein that the same may conform to the record of the case in the Patent Office.

Signed and sealed this 28th day of April, A. D., 1914.

[SEAL.]

J. T. NEWTON,
*Acting Commissioner of Patents.* wedge having angle faces engaging said interposed wedge blocks and the friction shoes respectively.

5. In a friction draft gear, the combination with the casing, friction shoes, and buffing block; of a plurality of segmental differential angle wedge blocks between the friction blocks and wedge block closely assembled together and adjacent to each other throughout their length, each of said blocks having between its ends interengaging rectangular shoulders and recesses co-acting with corresponding elements on the adjacent block to prevent relative longitudinal movement of either block and a terminal separating wedge having oppositely disposed series of wedge faces engaging the inner terminal faces of the friction shoes and wedge blocks respectively.

6. In a friction draft gear, the combination with a casing and a relatively movable draw bar; of friction shoes engaging the casing having inner acute and blunt wedge faces respectively, a central buffing wedge block, wedge blocks interposed between it and the acute wedge faces of the friction shoes, and a terminal separating wedge engaging said wedge blocks and having faces engaging the blunt faces of the friction shoes for expanding them within the casing when the casing or draw bar approaches the one toward the other.

7. In a friction draft gear, the combination with the casing and the relatively movable draw bar; of friction shoes engaging the casing having terminal wedge faces, a separating wedge engaging said faces, and means within the friction shoes for expanding them within the casing and for exerting inward pressure against said terminal wedge when the casing or draw bar approaches the one toward the other.

In testimony whereof I hereunto affix my signature in the presence of two witnesses.

JOHN F. COURSON.

Witnesses:
C. M. CLARKE,
CHAS. S. LEPLEY.

---

Correction in Letters Patent No. 1,011,034.

It is hereby certified that in Letters Patent No. 1,011,034, granted December 5, 1911, upon the application of John F. Courson, of Pitcairn, Pennsylvania, for an improvement in "Friction Draft-Gear," an error appears in the printed specification requiring correction as follows: Page 1, line 14, for the word "locks" read *blocks;* and that the said Letters Patent should be read with this correction therein that the same may conform to the record of the case in the Patent Office.

Signed and sealed this 28th day of April, A. D., 1914.

[SEAL.]

J. T. NEWTON,
*Acting Commissioner of Patents.*

It is hereby certified that in Letters Patent No. 1,011,034, granted December 5, 1911, upon the application of John F. Courson, of Pitcairn, Pennsylvania, for an improvement in "Friction Draft-Gear," an error appears in the printed specification requiring correction as follows: Page 1, line 14, for the word "locks" read *blocks;* and that the said Letters Patent should be read with this correction therein that the same may conform to the record of the case in the Patent Office.

Signed and sealed this 28th day of April, A. D., 1914.

[SEAL.]

J. T. NEWTON,
*Acting Commissioner of Patents.*